United States Patent [19]

Drent et al.

[11] Patent Number: 5,216,120
[45] Date of Patent: Jun. 1, 1993

[54] POLYMERIZATION OF CO/OLEFIN WITH CATALYST COMPRISING PALLADIUM COMPOUND, LEWIS ACID AND BRONSTED ACID

[75] Inventors: Eit Drent; Johannes J. Keijsper, both of Amsterdam, Netherlands

[73] Assignee: Shell Oil Company, Houston, Tex.

[21] Appl. No.: 833,211

[22] Filed: Feb. 10, 1992

[30] Foreign Application Priority Data

Feb. 26, 1991 [NL] Netherlands ............ 9100340

[51] Int. Cl.$^5$ .................................. C08G 67/02
[52] U.S. Cl. ........................ 528/392; 502/162; 502/167
[58] Field of Search .......................... 528/392

[56] References Cited

U.S. PATENT DOCUMENTS

| | | |
|---|---|---|
| 3,083,184 | 3/1963 | Loeb ............................ 528/392 |
| 4,778,876 | 10/1988 | Doyle et al. . |
| 4,806,630 | 2/1989 | Drent et al. . |
| 4,835,250 | 5/1989 | Drent . |
| 4,843,144 | 6/1989 | Van Broekhoven et al. . |
| 4,851,582 | 7/1989 | Drent . |
| 4,880,903 | 11/1989 | Van Broekhoven et al. . |
| 4,965,341 | 10/1990 | Van Doorn et al. . |

FOREIGN PATENT DOCUMENTS

| | | |
|---|---|---|
| 121965 | 10/1984 | European Pat. Off. . |
| 245893 | 11/1987 | European Pat. Off. . |
| 246683 | 11/1987 | European Pat. Off. . |

*Primary Examiner*—Harold D. Anderson

[57] ABSTRACT

An improved gas-phase process for the production of linear alternating polymers of carbon monoxide and at least one ethylenically unsaturated hydrocarbon employs a catalyst composition formed from a compound of palladium, an acidic component comprising a mixture of Lewis acid and Bronsted acid and a bidentate ligand of phosphorus, nitrogen or sulfur.

22 Claims, No Drawings

POLYMERIZATION OF CO/OLEFIN WITH CATALYST COMPRISING PALLADIUM COMPOUND, LEWIS ACID AND BRONSTED ACID

FIELD OF THE INVENTION

This invention relates to a process for the production of linear alternating polymers of carbon monoxide and at least one ethylenically unsaturated hydrocarbon. More particularly, the invention relates to such a process conducted in the presence of a novel catalyst composition.

BACKGROUND OF THE INVENTION

The class of linear alternating polymers of carbon monoxide and at least one ethylenically unsaturated hydrocarbon is now well known in the art. Such polymers are broadly represented by the repeating formula

  (I)

wherein A is a moiety derived from at least one ethylenically unsaturated hydrocarbon polymerized through the ethylenic unsaturation thereof.

A number of processes are known for producing such polymers which are now conventionally referred to as polyketones or polyketone polymers. The process typically involves the use of a catalyst composition formed from a compound of a Group VIII metal selected from palladium, cobalt or nickel, the anion of a strong non-hydrohalogenic acid and a bidentate ligand of phosphorus, nitrogen or sulfur. Van Broekhoven et al., U.S. Pat. Nos. 4,843,144 and 4,880,903, describe process for polyketone production which use catalyst compositions formed from, inter alia, bidentate phosphorus ligands. Similar processes using bidentate ligands of nitrogen are shown by U.S. Pat. No. 4,851,582 and processes using bidentate sulfur ligands are described in U.S. Pat. No. 4,965,341.

The nature of the polyketone polymerization process is variable. The above van Broekhoven et al. patents employ a catalyst composition which is substantially homogeneous and soluble in the reaction media which includes a reaction diluent. Such reactions are liquid phase. A slurry-phase reaction is described by copending U.S. patent application Ser. No. 716,487, filed Jun. 17, 1991, wherein the catalyst is produced by reaction of the catalyst composition with a heterogeneous carrier. Gas-phase processes conducted in the substantial absence of liquid reaction diluent are described in U.S. Pat. Nos. 4,778,876 and 4,806,630.

In the liquid-phase processes or slurry-phase processes the polyketone polymer product is obtained as a material substantially insoluble in the reaction medium. The use of gas-phase processes provides benefits in that filtration or centrifugation steps are not typically required in order to recover the polymer product. It would be of advantage to provide an additional gas-phase process for the production of linear alternating polymer of carbon monoxide and at least one ethylenically unsaturated hydrocarbon.

SUMMARY OF THE INVENTION

The present invention provides a gas-phase process for the production of linear alternating polymers of carbon monoxide and at least one ethylenically unsaturated hydrocarbon. More particularly, the invention provides such an improved gas phase process which is conducted in the presence of a catalyst composition formed from a compound of specified Group VIII metal, an acidic component which comprises a mixture of certain Lewis and Bronsted acids and a bidentate ligand of phosphorus, nitrogen or sulfur. Certain of the catalyst compositions are novel.

DESCRIPTION OF THE INVENTION

The polyketone polymers which are produced according to the invention are of a linear alternating structure and contain substantially one molecule of carbon monoxide for each molecule of ethylenically unsaturated hydrocarbon Suitable ethylenically unsaturated hydrocarbons for use as monomers in the polymerization process have up to 20 carbon atoms inclusive, preferably up to 10 carbon atoms inclusive, and are aliphatic such as ethylene and other α-olefins including propylene, 1-butene, isobutylene, 1-hexene, 1-octene and 1-dodecene, or are arylaliphatic containing an aryl substituent on an otherwise aliphatic molecule, particularly an aryl substituent on a carbon atom of the ethylenic unsaturation. Illustrative of this latter class of ethylenically unsaturated hydrocarbons are styrene, p-methylstyrene, p-ethylstyrene and m-isopropylstyrene. The preferred polyketone polymers are copolymers of carbon monoxide and ethylene or terpolymers of carbon monoxide, ethylene and a second ethylenically unsaturated hydrocarbon of at least 3 carbon atoms, particularly an o-olefin such as propylene.

When the preferred terpolymers are produced by the process of the invention, there will be at least 2 units derived from ethylene for each unit derived from the second ethylenically unsaturated hydrocarbon. Preferably there will be from about 10 units to about 100 units derived from ethylene for each unit derived from the second ethylenically unsaturated hydrocarbon. The preferred polyketone polymers are therefore represented by the following repeating formula

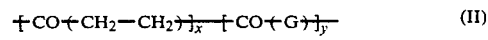  (II)

wherein G is derived from the second ethylenically unsaturated hydrocarbon of at least 3 carbon atoms by polymerization through the ethylenic unsaturation thereof and the ratio of y:x is no more than about 0.5. When copolymers of carbon monoxide and ethylene are produced there will be no second hydrocarbon present and the copolymers are represented by the above formula II wherein y is zero. When y is other than zero, i.e., terpolymers are produced, the —CO—(—CH$_2$—CH$_2$—)— units and the —CO—(—G—)— units are found randomly throughout the polymer chain and the preferred ratios of y:x are from about 0.01 to about 0.1. The end groups or "caps" of the polymer chain will depend upon what materials were present during polymerization and whether and how the polymer was purified. The precise nature of the end groups does not appear to influence the properties of the polymer to any considerable extent so that the polymers are fairly represented by the formula for the polymeric chain as depicted above.

Of particular interest are the polyketone polymers of number average molecular weight from about 1,000 to about 200,000, particularly those polymers of number average molecular weight from about 20,000 to about 90,000, as determined by gel permeation chromatography. The physical properties of the polymers will depend in part on the molecular weight, whether the polymers are copolymers or terpolymers and, in the case of terpolymers the nature of and the proportion of the second hydrocarbon present. Typical melting points for such polymers are from about 175° C. to about 300° C., more typically from about 210° C. to about 270° C. The polymers have a limiting viscosity number, as determined in a conventional capillary viscosity measuring device in m-cresol at 60° C., of from about 0.4 dl/g to about 10 dl/g, but more often from about 0.5 dl/g to about 4 dl/g.

The process for the production of linear alternating polymers of the invention comprises contacting the carbon monoxide and ethylenically unsaturated hydrocarbon under polymerization conditions in the gas phase in the substantial absence of liquid reaction diluent and in the presence of a catalyst composition formed from a compound of palladium, an acid component comprising a Lewis acid/Bronsted acid mixture, and a bidentate ligand of phosphorus, nitrogen or sulfur. Although a variety of palladium compounds are suitably employed as precursor of the catalyst composition, the preferred palladium compounds are palladium carboxylates and palladium acetate, palladium propionate, palladium butyrate and palladium hexanoate are satisfactory. Particularly preferred as the palladium compound is palladium acetate.

The acid component of the catalyst composition is a mixture of a Lewis acid and certain Bronsted acids. The Lewis acid portion is a binary halide of a Group III-Group V element of the Periodic Table of Elements and the halide portion is preferably fluorine, chlorine or bromine. Illustrative of Lewis acid metal bromides are aluminum tribromide, boron tribromide, gallium tribromide, germanium tetrabromide and phosphorus pentabromide. Lewis acid chlorides include boron trichloride, silicon tetrachloride, germanium tetrachloride and antimony pentachloride. The preferred Lewis acids, however, are fluorides including boron trifluoride, aluminum trifluoride, gallium trifluoride, silicon tetrafluoride, titanium tetrafluoride, antimony pentafluoride, arsenic pentafluoride, tantalum pentafluoride and phosphorus pentafluoride. Especially preferred as the Lewis acid is boron trifluoride, titanium tetrafluoride, phosphorus pentafluoride or antimony pentafluoride. For use as the acid component of the catalyst compositions of the invention, the Lewis acid is mixed with a Bronsted acid which comprises a hydrohalogenic acid, e.g., hydrogen fluoride, hydrogen chloride or hydrogen bromide. In the acidic mixture, the use of Lewis acids and Bronsted acids in which the anion is the same anion is preferred and particularly preferred as the Bronsted acid component is hydrogen fluoride. The proportions of Lewis acid to Bronsted acid in the mixed acidic component is from about 0.1 mole to about 10 moles of Bronsted acid per mole of Lewis acid, preferably from about 0.5 mole to about 5 mole of Bronsted acid per mole of Lewis acid. Particularly preferred are the approximately equal equivalent mixtures of Lewis acid and Bronsted acid which are termed tetrafluoroboric acid, hexafluorotitanic acid, hexafluorophosphoric acid and hexafluoroantimonic acid. Whatever the relative proportions of Lewis acid are Bronsted acids, the acidic component is provided to the catalyst composition in a quantity of Lewis acid from about 0.5 mole to about 200 moles per mole of palladium, preferably a quantity of Lewis acid from about 1 mole to about 100 moles per mole of palladium.

The bidentate ligand component of the catalyst composition is a bidentate ligand of phosphorus, nitrogen or sulfur. In the case of bidentate ligands of nitrogen, the preferred bidentate ligands are of the formula

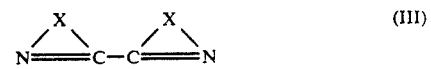

wherein X independently is a divalent bridging group of up to 10 carbon atoms with 3 or 4 atoms in the bridge at least two of which are carbon atoms. Preferred among such ligands are 2,2'-bipyridine and 1,10-phenanthroline.

When the catalyst composition is formed from a bidentate ligand of sulfur, the preferred sulfur bidentate ligands are represented by the formula

wherein R independently is aliphatic or aromatic of up to 10 atoms inclusive and $R^1$ is a divalent hydrocarbyl linking group of up to 10 carbon atoms inclusive with from 2 to 4 carbon atoms in the bridge. R independently is hydrocarbyl or is substituted hydrocarbyl with any non-hydrocarbyl substituents being inert. Illustrative of suitable R groups are methyl, ethyl, butyl, 5-chloropentyl, hexyl, phenyl, tolyl, 2-methoxyphenyl and 2,4-diethoxyphenyl. In the case of the preferred bidentate sulfur ligands, preferred R groups are straight-chain alkyl groups of up to 4 carbon atoms inclusive or benzyl. The $R^1$ linking group is preferably aliphatic, e.g., 1,2-ethylene, 1,3-propylene, 1,4-butylene and 2,2-dimethyl-1,3-propylene. In the case of bidentate ligands of sulfur, the preferred $R^1$ group is 1,2-ethylene and the preferred bidentate sulfur ligands are 1,2-di(ethylthio)ethane and 1,2-di(benzylthio)ethane.

The bidentate ligands of phosphorus which are useful in the catalyst compositions of the invention are represented by the formula

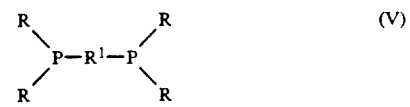

wherein R and $R^1$ have the previously stated meanings. In the case of bidentate ligands of phosphorus, however, the preferred R groups are aromatic, e.g., phenyl and phenyl substituted with a polar group, particularly a lower alkoxy group, on at least one ring carbon atom ortho to the ring carbon atom through which the group is connected to the phosphorus. Suitable substituted phenyl R groups are 2-methoxyphenyl, 2,4-diethoxyphenyl, 2-cyanophenyl and 2,6-diethoxyphenyl. The 2-methoxyphenyl group is particularly preferred. The preferred $R^1$ group of the phosphorus bidentate ligands is 1,3-propylene and the preferred bidentate phosphorus ligands are 1,3-bis(diphenylphosphino)propane and 1,3-bis[di(2-methoxyphenyl)phosphino]propane.

If the catalyst complexes of the invention are formed from a bidentate ligand of nitrogen or sulfur, the quantity of ligand to be used is from about 0.05 mole to about 100 moles of ligand per mole of palladium, particularly from about 1 mole to about 50 moles of ligand per mole of palladium. If a bidentate ligand of phosphorus is utilized, the quantity of ligand is from about 0.5 mole to about 2 moles per mole of palladium, preferably from about 0.75 to about 1.5 mole per mole of palladium. Of the types of bidentate ligand usefully incorporated within the catalyst compositions, the use of bidentate ligands of phosphorus is preferred, although the catalyst compositions formed from bidentate ligands of nitrogen or sulfur are novel.

It is useful on occasion to additionally incorporate within the catalyst composition an organic oxidizing agent. Suitable agents include aliphatic nitrites, aromatic nitro compounds and hydroquinones, both 1,2-hydroquinones and 1,4-hydroquinones. The preferred agents are nitrobenzene and 1,4-hydroquinones, particularly 1,4-benzoquinone and 1,4-naphthoquinone. As stated, no oxidizing agent is required but amounts of oxidizing agent up to about 5,000 moles per mole of palladium are satisfactory. When oxidizing agent is present, amounts from about 10 moles to about 1,000 moles per mole of palladium are preferred.

The catalyst compositions are produced by mixing the components. The mixing is often facilitated by the use of a diluent such as an alkanol, e.g., methanol or ethanol, or an ether, e.g., tetrahydrofuran or dioxane. Subsequent to the formation of catalyst composition, any substantial quantity of the diluent is removed as by evaporation. The catalyst composition is utilized in the gas-phase process of the invention by various methods. In one modification, the catalyst composition including the diluent added to facilitate mixing is sprayed into the reactor where polymerization is to take place. The diluent is then at least substantially removed. In a preferred modification, the catalyst composition including diluent is used to impregnate a solid, porous, particulate support to form a supported catalyst to be used in the polymerization and the diluent is then substantially removed. The precise nature of the catalyst support is not critical as long as it is inert toward the reactants and catalyst composition. Inorganic support materials include talc, silica and alumina whereas suitable organic support materials include cellulose, dextrose and dextran as well as polyolefin materials such as polyethylene, polypropylene and polystyrene. The preferred catalyst support material, however, is a preformed linear alternating polymer of carbon monoxide and at least one ethylenically unsaturated hydrocarbon which is generally the same as or similar to the linear alternating polymer being produced in the process of the invention.

The polymerization is conducted by contacting the carbon monoxide and ethylenically unsaturated hydrocarbon under polymerization conditions in the presence of a catalytic quantity of the catalyst composition. Typical polymerization conditions include a reaction temperature from about 25° C. to about 150° C., preferably from about 30° C. to about 130° C. The reaction pressure is suitably from about 2 bar to about 150 bar, but pressures from about 5 bar to about 100 bar are more often utilized. The catalyst composition is used in an amount sufficient to provide from about $1 \times 10^{-7}$ mole to about $1 \times 10^{-3}$ mole of palladium per mole of total ethylenically unsaturated hydrocarbon to be polymerized. Quantities of catalyst composition sufficient to provide from about $1 \times 10^{-6}$ mole to about $1 \times 10^{-4}$ mole of palladium per mole of total ethylenically unsaturated hydrocarbon are preferred. The molar ratio of carbon monoxide to total ethylenically unsaturated hydrocarbon is from about 10:1 to about 1:10 but preferably from about 5:1 to about 1:5. It is useful on some occasions to provide to the reaction mixture a small amount of hydrogen or an alkanol such as methanol or ethanol in order to favorably effect the molecular weight of the polymer product. Methanol is preferred for this purpose which may be deliberately added to the reaction mixture or result from incomplete removal of methanol from the catalyst composition.

The gas-phase polymerization process is conducted in the substantial absence of liquid reaction diluent and is conducted in a batchwise, continuous or semi-continuous manner. The polymer product is obtained as a mixture with the catalyst support which also contains amounts of catalyst residues The polymer is utilized as such or is purified if desired by treatment with a solvent or an extraction agent selective for catalyst residues. The polyketone polymer is separated, if desired, from the support through the use of a solvent such as m-cresol or hexafluoroisopropanol in which the polyketone polymer is soluble but the support material is not. Removal of the solvent as by evaporation or distillation will provide the polyketone product. In the preferred embodiment where the support is a preformed linear alternating polymer of the same general type as the polymer being produced, separation from the catalyst support material is not typically required.

The polyketone polymers are thermoplastic materials of relatively high melting points and are useful as engineering thermoplastics. They are processed by methods conventional for thermoplastics such as extrusion, injection molding and thermoforming into a variety of shaped articles of established utility. Specific applications include containers for food and drink and parts and housings for automotive applications.

The invention is further illustrated by the following Comparative Experiments (not of the invention) and the Illustrative Embodiments which should not be regarded as limiting. In all cases the polymer produced was examined by NMR analysis and found to be linear with alternating units derived from carbon monoxide and units derived from ethylene.

ILLUSTRATIVE EMBODIMENT I

A copolymer of carbon monoxide and ethylene was prepared using a catalyst formed by adsorbing, on 8 g of a linear alternating copolymer of carbon monoxide and ethylene, a catalyst composition solution containing 1.5 ml methanol, 1.5 ml tetrahydrofuran, 0 0095 mmol palladium acetate, 0.024 mmol tetrafluoroboric acid and 0.0104 mmol 1,3-bis[di(2-methoxyphenyl)phosphino]-propane. The catalyst was placed in an autoclave of 300 ml capacity equipped with a mechanical stirrer and the air in the autoclave was displaced with nitrogen The autoclave and contents were warmed to 85° C. and an equimolar mixture of carbon monoxide and ethylene was added until a pressure of 50 bar was reached. Hydrogen was then added until a pressure of 55 bar was reached. During the resulting polymerization the pressure was maintained at 55 bar by continuing addition of the equimolar mixture. After 10 hours, the polymerization was terminated by cooling the autoclave and contents and rehearsing the pressure.

The yield of polymer was 80.1 g, produced at the rate of 7.1 kg of copolymer/g Pd hr.

ILLUSTRATIVE EMBODIMENT II

A carbon monoxide/ethylene copolymer was obtained by a procedure substantially similar to that of Illustrative Embodiment I except that the catalyst solution contained 0.19 mmol of tetrafluoroboric acid instead of 0.024 mmol and the reaction time was 4.3 hours instead of 10 hours.

The yield of copolymer was 30.2 g, produced at the rate of 5.1 kg of copolymer/g Pd hr.

ILLUSTRATIVE EMBODIMENT III

A carbon monoxide/ethylene copolymer was produced by a process substantially similar to that of Illustrative Embodiment I except that the catalyst solution contained 0.014 mmol of hexafluorotitanic acid instead of tetrafluoroboric acid, the reaction temperature was 82° C. instead of 85° C. and the reaction time was 4.2 hours instead of 10 hours.

The yield of copolymer was 34.1 g, produced at the rate of 5.9 kg of copolymer/g Pd hr.

ILLUSTRATIVE EMBODIMENT IV

A copolymer of carbon monoxide and ethylene was produced by a process substantially similar to that of Illustrative Embodiment I except that 0.19 mmol of hexafluorotitanic acid was used instead of tetrafluoroboric acid and the reaction time was 4.2 hours instead of 10 hours.

The yield of copolymer was 27.0 g, produced at the rate of 4.5 kg of copolymer/g Pd hr.

ILLUSTRATIVE EMBODIMENT V

A carbon monoxide/ethylene copolymer was produced by a process substantially similar to that of Illustrative Embodiment I except that the catalyst solution contained 0.028 mmol of hexafluorophosphoric acid instead of tetrafluoroboric acid and the reaction time was 4.5 hours instead of 10 hours.

The yield of copolymer was 28.4 g, obtained at a rate of 6.1 kg of copolymer/g Pd hr.

ILLUSTRATIVE EMBODIMENT VI

A copolymer of carbon monoxide and ethylene was produced by a process substantially similar to that of Illustrative Embodiment I except that the catalyst solution contained 0.024 mmol hexafluoroantimonic acid instead of tetrafluoroboric acid and the reaction time was 5.4 hours instead of 10 hours.

The yield of copolymer was 32.4 g, produced at a rate of 4.5 kg of copolymer/g Pd hr.

COMPARATIVE EXPERIMENT I

A carbon monoxide/ethylene copolymer was produced by a procedure substantially identical to that of Illustrative Embodiment I except that the catalyst solution contained 0.028 methanesulfonic acid instead of tetrafluoroboric acid and the reaction time was 5 hours instead of 10 hours.

The yield of copolymer was 15.6 g, produced at a rate of 1.5 kg of copolymer/g Pd hr.

COMPARATIVE EXPERIMENT II

A carbon monoxide/ethylene copolymer was produced by a process substantially similar to that of Illustrative Embodiment I except that the catalyst solution contained 0.19 mmol methanesulfonic acid instead of tetrafluoroboric acid and the reaction time was 4.8 hours instead of 10 hours.

The yield of copolymer was 10.9 g, produced at the rate of 0.6 kg of copolymer/g Pd hr.

COMPARATIVE EXPERIMENT III

A copolymer of carbon monoxide and ethylene was produced by a process substantially similar to that of Illustrative Embodiment I except that the catalyst solution contained 0.024 mmol p-toluenesulfonic acid instead of tetrafluoroboric acid and the reaction time was 4.6 hours instead of 10 hours.

The yield of copolymer was 16.8 g, produced at the rate of 1.9 kg of copolymer/g Pd hr.

COMPARATIVE EXPERIMENT IV

A carbon monoxide/ethylene copolymer was produced by a process substantially similar to that of Illustrative Embodiment I, except that the catalyst solution contained 0.19 mmol p-toluenesulfonic acid instead of tetrafluoroboric acid an the reaction time was 4.6 hours instead of 10 hours.

The yield of copolymer was 8.3 g, produced at the rate of 0.1 kg of copolymer/g Pd hr.

COMPARATIVE EXPERIMENT V

A copolymer of carbon monoxide and ethylene was produced by changing to an autoclave of 300 ml capacity equipped with a mechanical stirrer a catalyst solution containing 50 ml of methanol, 0.1 mmol palladium acetate, 0.2 mmol methanesulfonic acid and 0.15 mmol 1,3-bis[di(2-methoxyphenyl)phosphino]propane. After the air had been displaced from the autoclave with nitrogen and the autoclave and contents were warmed to 89° C., an equimolar mixture of carbon monoxide and ethylene was added until a pressure of 55 bar was reached. During the resulting polymerization, the pressure was maintained at 55 bar by continuing addition of the equimolar mixture. After 2 hours the polymerization was terminated by cooling the autoclave and contents and releasing the pressure. The polymer product was recovered by filtration, washed with methanol and dried.

The yield of copolymer was 22.3 g, produced at a rate of 10.5 kg of copolymer/g Pd hr.

COMPARATIVE EXPERIMENT VI

A copolymer of carbon monoxide and ethylene was produced by a procedure substantially similar to that of Comparative Experiment V except that the catalyst solution contained 0.19 mmol of p-toluenesulfonic acid instead of the methanesulfonic acid and the reaction temperature was 88° C. instead of 89° C.

The yield of copolymer was 19.5 g, produced at a rate of 9.7 kg of copolymer/g Pd hr.

What is claimed is:

1. A process for producing a linear alternating polymer of carbon monoxide and at least one ethylenically unsaturated hydrocarbon by contacting the carbon monoxide and ethylenically unsaturated hydrocarbon in the gas phase in the substantial absence of liquid reaction diluent under polymerization conditions in the presence of a catalyst composition formed from a compound of palladium, an acid component and a bidentate ligand, wherein the acidic component is a mixture of a Lewis acid and a Bronsted acid, and wherein the Lewis acid is a halide of a Group III-Group V element of the Periodic Table of Elements and the Bronsted acid is a hydrogen halide.

2. The process of claim 1 wherein the Group III-Group V element is aluminum, boron, gallium, germanium, antimony, silicon, titanium, arsenic, tantalum, or phosphorus.

3. The process of claim 2 wherein the Bronsted acid is hydrogen fluoride, hydrogen chloride or hydrogen bromide.

4. The process of claim 3 wherein the Lewis acid is boron trifluoride, titanium tetrafluoride, phosphorus pentafluoride or antimony pentafluoride.

5. The process of claim 4 wherein the Bronsted acid is hydrogen fluoride.

6. The process of claim 5 wherein the proportion of acids is from about 0.1 mole to about 10 moles of Bronsted acid per mole of Lewis acid.

7. The process of claim 6 wherein the Lewis acid is boron trifluoride.

8. The process of claim 6 wherein the Lewis acid is titanium tetrafluoride.

9. A process producing a linear alternating copolymer of carbon monoxide and ethylene by contacting carbon monoxide and ethylene in the gas phase in the substantial absence of liquid reaction diluent under polymerization conditions in the presence of a catalyst composition formed from a compound of palladium, an acidic component and a bidentate ligand, wherein the acidic component is a mixture of a Lewis acid and a Bronsted acid, and wherein the Lewis acid is a halide of a Group III-Group V element of the Periodic Table of Elements and the Bronsted acid is a hydrogen halide.

10. The process of claim 9 wherein the Group III-Group V element is aluminum, boron, gallium, germanium, antimony, silicon, titanium, arsenic, tantalum, or phosphorus.

11. The process of claim 10 wherein the Bronsted acid is hydrogen fluoride, hydrogen chloride or hydrogen bromide.

12. The process of claim 11 wherein the Lewis acid is boron trifluoride, titanium tetrafluoride, phosphorus pentafluoride or antimony pentafluoride.

13. The process of claim 12 wherein the Bronsted acid is hydrogen fluoride.

14. The process of claim 13 wherein the proportion of acids is from about 0.1 mole to about 10 moles of Bronsted acid per mole of Lewis acid.

15. The process of claim 14 wherein the Lewis acid is boron trifluoride.

16. The process of claim 14 wherein the Lewis acid is titanium tetrafluoride.

17. A process for producing linear alternating terpolymer of carbon monoxide, ethylene and propylene by contacting the carbon monoxide, ethylene and propylene in the gas phase in the substantial absence of reaction diluent under polymerization conditions in the presence of a catalyst composition formed from a compound of palladium, an acidic component and a bidenate ligand, wherein the acidic component is a mixture of a halide of a Group III-Group V element of the Periodic Table of Elements and hydrogen halide.

18. The process of claim 17 wherein the Group III-Group V halide is a fluoride selected from the group consisting of boron trifluoride, titanium tetrafluoride, phosphorus pentafluoride, and antimony pentafluoride.

19. The process of claim 18 wherein the hydrogen halide is hydrogen fluoride.

20. The process of claim 19 wherein the proportion of Group III-V fluoride and hydrogen fluoride is from about 0.1 mole to about 10 moles of hydrogen fluoride per mole of Group III-V fluoride.

21. The process of claim 20 wherein the Group III-V fluoride is boron trifluoride.

22. The process of claim 20 wherein the Group III-Group V fluoride is titanium tetrahalide.

* * * * *